(12) United States Patent
Maslowski

(10) Patent No.: US 10,654,393 B2
(45) Date of Patent: May 19, 2020

(54) TRUCK LIFT GATE SYSTEM

(71) Applicant: Jerzy Maslowski, Oak Lawn, IL (US)

(72) Inventor: Jerzy Maslowski, Oak Lawn, IL (US)

(*) Notice: Subject to any disclaimer, the term of this patent is extended or adjusted under 35 U.S.C. 154(b) by 0 days.

(21) Appl. No.: 16/199,214

(22) Filed: Nov. 25, 2018

(65) Prior Publication Data

US 2019/0160993 A1 May 30, 2019

Related U.S. Application Data

(60) Provisional application No. 62/590,630, filed on Nov. 26, 2017.

(51) Int. Cl.
*B60P 1/44* (2006.01)

(52) U.S. Cl.
CPC ............. *B60P 1/4492* (2013.01); *B60P 1/44* (2013.01); *B60P 1/4471* (2013.01); *B60P 1/4485* (2013.01)

(58) Field of Classification Search
CPC ............................ B60P 1/4492; B60P 1/4471
See application file for complete search history.

(56) References Cited

U.S. PATENT DOCUMENTS

| | | | | |
|---|---|---|---|---|
| 2013/0136567 | A1* | 5/2013 | Hambardzumyan | ... F16C 11/10 414/540 |
| 2014/0079517 | A1* | 3/2014 | Ablabutyan | ............ B60P 1/445 414/546 |

\* cited by examiner

*Primary Examiner* — Saul Rodriguez
*Assistant Examiner* — Willie Berry, Jr.
(74) *Attorney, Agent, or Firm* — Bruce A. Lev

(57) ABSTRACT

A dual hinged, diamond-steel plate structured and arranged to swing to cover the gap between a truck or trailer's floor and its lift-gate thereby eliminating the gap in between the trailer floor and lift gate to make loading and unloading the truck trailer a much easier and smoother operation.

12 Claims, 3 Drawing Sheets

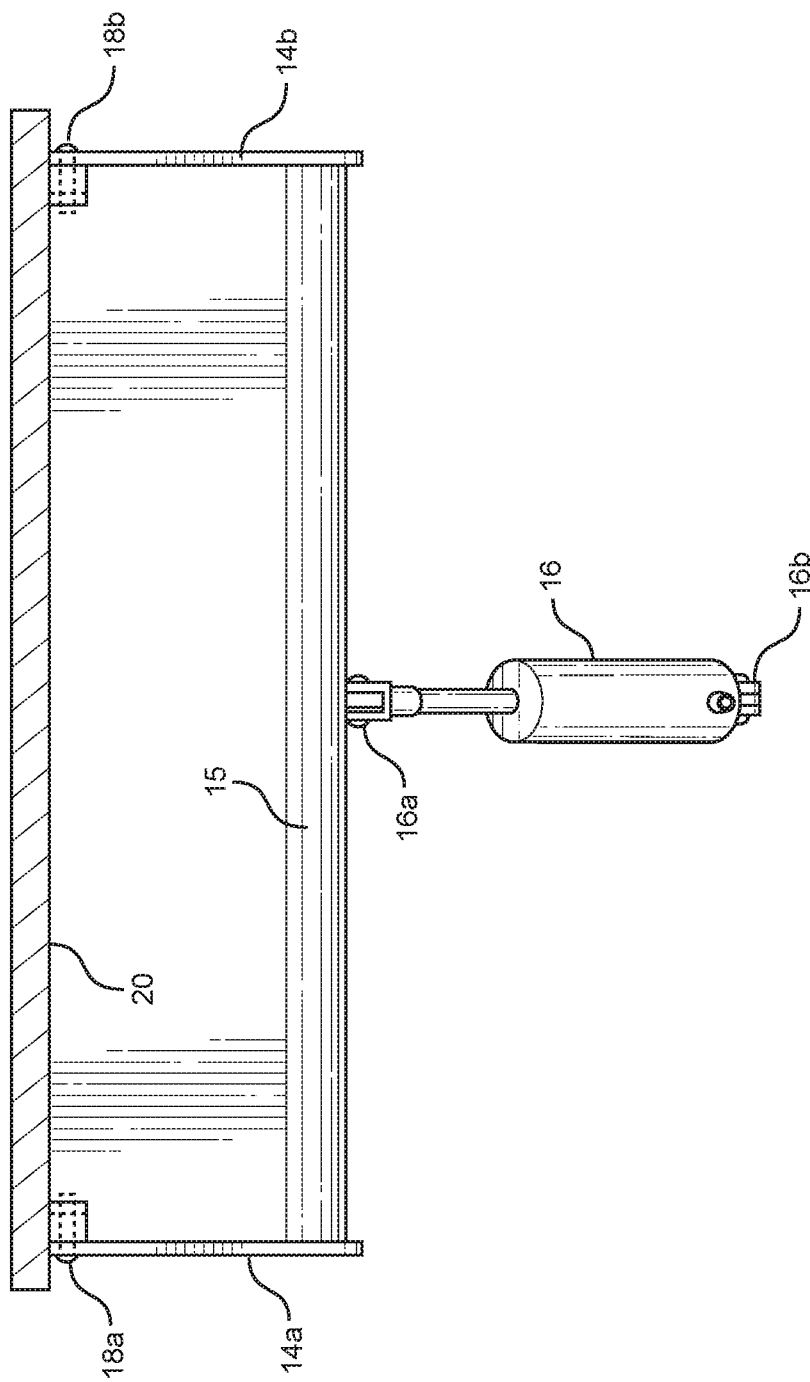

TRUCK LIFT GATE SYSTEM

CROSS-REFERENCE TO RELATED APPLICATION

The present application is related to and claims priority from prior provisional application Ser. No. 62/590,630, filed Nov. 26, 2017 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of extension plates and more specifically relates to a dual hinged, diamond-steel plate structured and arranged to swing to cover the gap between a truck or trailer's floor and its lift-gate thereby eliminating the gap in between the trailer floor and lift gate to make loading and unloading the truck trailer a much easier and smoother operation.

2. Description of the Related Art

Almost all of us today rely upon a vast network of strangers to bring us the essentials of life, from the water that runs from our taps to the electricity that powers our refrigerators, to the milk on the top shelf. But few of us know much about, or ever stop to consider, the complicated networks of production, transport, and distribution which stretch invisibly between ourselves as consumers and the people responsible for the products, goods, and services upon which we depend. It seldom occurs to us, for example, that the milk on the top shelf in our refrigerator in suburban Virginia may be the final output of a complex system which begins with a dairy farm in Maryland or Pennsylvania, moves on to a pasteurizing and packaging plant in Delaware, then radiates up and down the East Coast via refrigerated trucks, the Interstate highway arteries, and a spoked, nodal system of refrigerated distribution and delivery centers.

Because they are really separate worlds unto themselves, the great and overarching systems which supply us with clean water, abundant electricity, and an endless flow of goods and services are likely to remain a mystery to us. We all have our own work to do—probably its intricacies are a mystery to everybody else—and we don't really care about the details of how we get our morning paper, as long as we get it. Likewise, we are inevitably ignorant of the details, annoyances, and frustrations inherent in another person's occupation.

While eminently useful in lowering freight to the ground or raising it to the level of the truck's floor or bed, the problem with lift-gates is the gap between their surface and the floor or bed of a truck or trailer—a gap in which freight can be caught, snagged, and damaged.

Various attempts have been made to solve problems found in extension plates art. Among these are found in: U.S. Patent No. 2014/0079517 to Karapet Ablabutyan; U.S. Pat. No. 9,403,469 to Peter M. Parker; and U.S. Pat. No. 8,905,703 to Kim Baechler. This prior art is representative of lift gate extension plates.

None of the above inventions and patents, taken either singly or in combination, is seen to describe the invention as claimed. Thus, a need exists for a reliable Lift Gate Extension Plate, a dual hinged, diamond-steel plate structured and arranged to swing to cover the gap between a truck or trailer's floor and its lift-gate thereby eliminating the gap in between the trailer floor and lift gate to make loading and unloading the truck trailer a much easier and smoother operation and to avoid the above-mentioned problems.

BRIEF SUMMARY OF THE INVENTION

In view of the foregoing disadvantages inherent in the known extension plates art, the present invention provides a novel Lift Gate Extension Plate. The general purpose of the present invention, which will be described subsequently in greater detail is to provide a dual hinged, diamond-steel plate structured and arranged to swing to cover the gap between a truck or trailer's floor and its lift-gate thereby eliminating the gap in between the trailer floor and lift gate to make loading and unloading the truck trailer a much easier and smoother operation.

The present invention holds significant improvements and serves as a Lift Gate Extension Plate. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, a Lift Gate Extension Plate, constructed and operative according to the teachings of the present invention.

FIG. 5 is a partially broken away view schematically illustrating the lifting and lowering mechanism of the Lift Gate Extension Plate according to an embodiment of the present invention of FIG. 1.

The various embodiments of the present invention will hereinafter be described in conjunction with the appended drawings, wherein like designations denote like elements.

DETAILED DESCRIPTION

Figure 1:
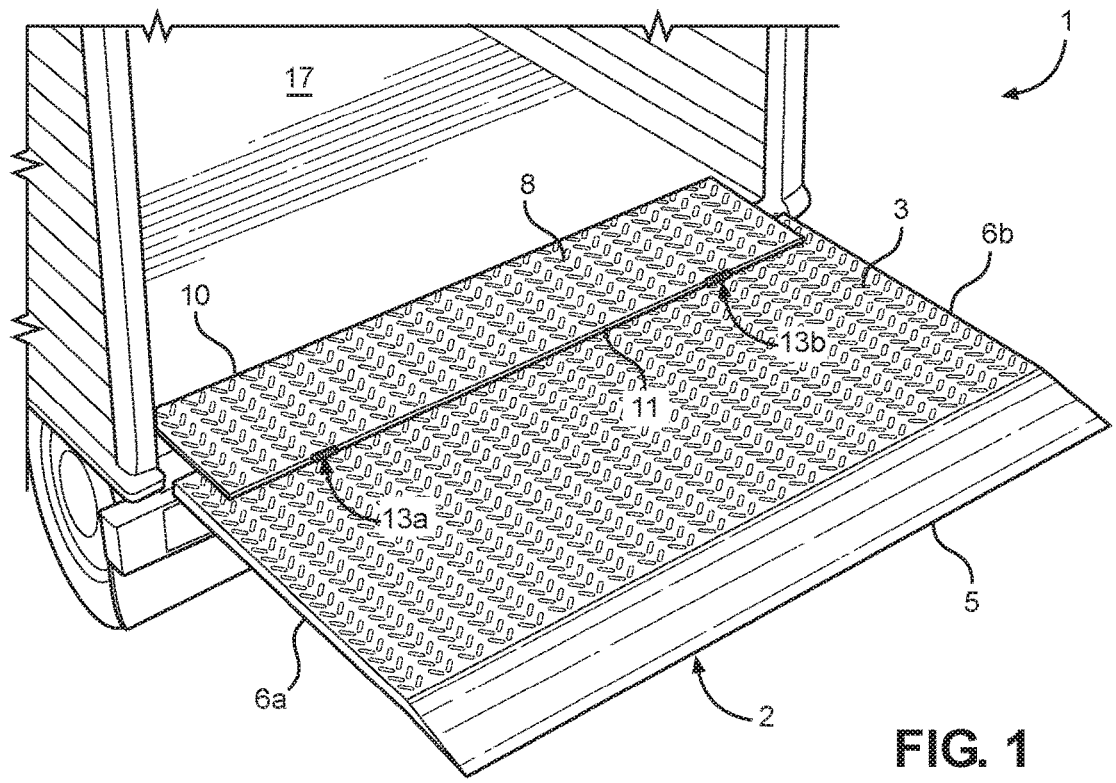
FIG. 1 shows a perspective view illustrating a Lift Gate Extension Plate in the loading position according to an embodiment of the present invention.

As discussed above, embodiments of the present invention relate to a Lift Gate Extension Plate and more particularly to a truck lift gate system as used to improve the handling of goods.

Referring to the drawings by numerals of reference there is shown in FIGS. 1-5, a truck lift gate system 1 including a lift gate platform 2 having an upper surface 3, a front edge portion 4, back edge portion 5 and two parallel spaced side edge portions 6a and 6b and a lower surface 20.

The truck lift gate system 1 further includes a lifting and lowering mechanism 7 which includes two spaced parallel linkage members 14a and 14b, a connection bar 15 and a hydraulic cylinder 16 as can be best seen in FIG. 5. The linkage members 14a and 14b are pivotally connected to the lower surface 20 of the lift gate platform 2 by pivot connections 18a and 18b respectively.

The connection bar 15 is rigidly connected between the two spaced parallel linkage members 14a and 14b respectively and is connected to the lift gate platform 2. The hydraulic cylinder 16 is pivotally connected at a proximal end 16a to the connector bar 15 and is pivotally connected at a distal end 16b to the back end section 17a of the truck 17 and is adapted to move the lift gate platform 2 in and out of the loading position with respect to the loading platform of the truck 17. The distal end 16b of the hydraulic cylinder 16 may be suitably pivotally mounted to the back end section 17a of the truck 17 and configured to move the lift gate platform 2 in and out of the loading position with respect to the loading platform of the truck 17.

Figure 2:
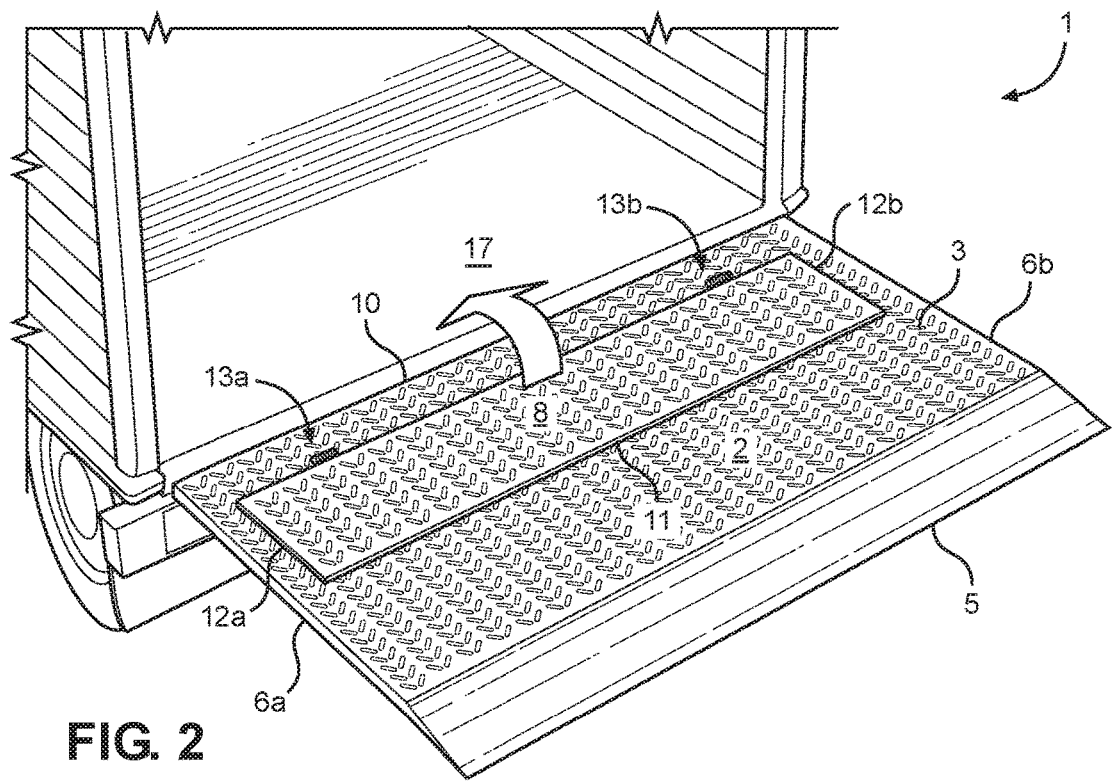
FIG. 2 is a perspective view illustrating a Lift Gate Extension Plate out of the loading position according to an embodiment of the present invention of FIG. 1.
Figure 3:
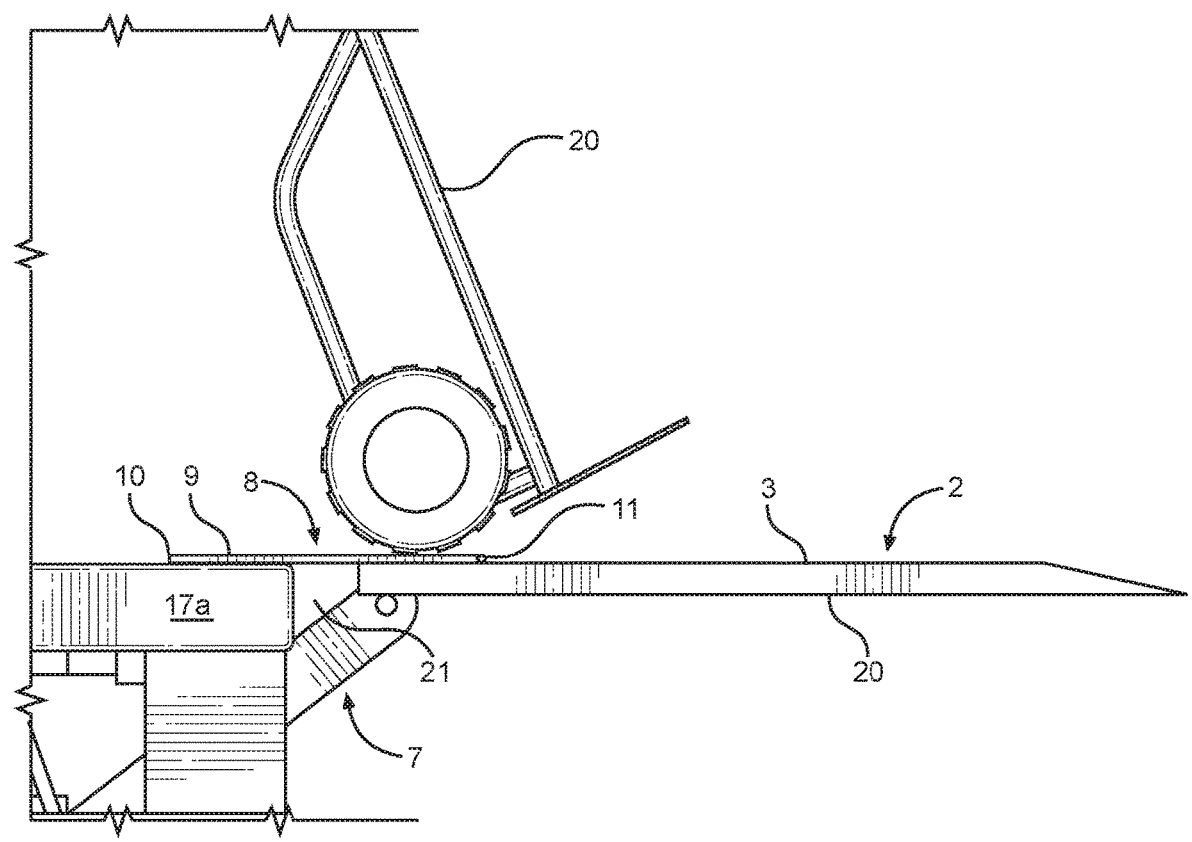
FIG. 3 is a side view illustrating Lift Gate Extension Plate in the loading position according to an embodiment of the present invention of FIG. 1.
Figure 4:
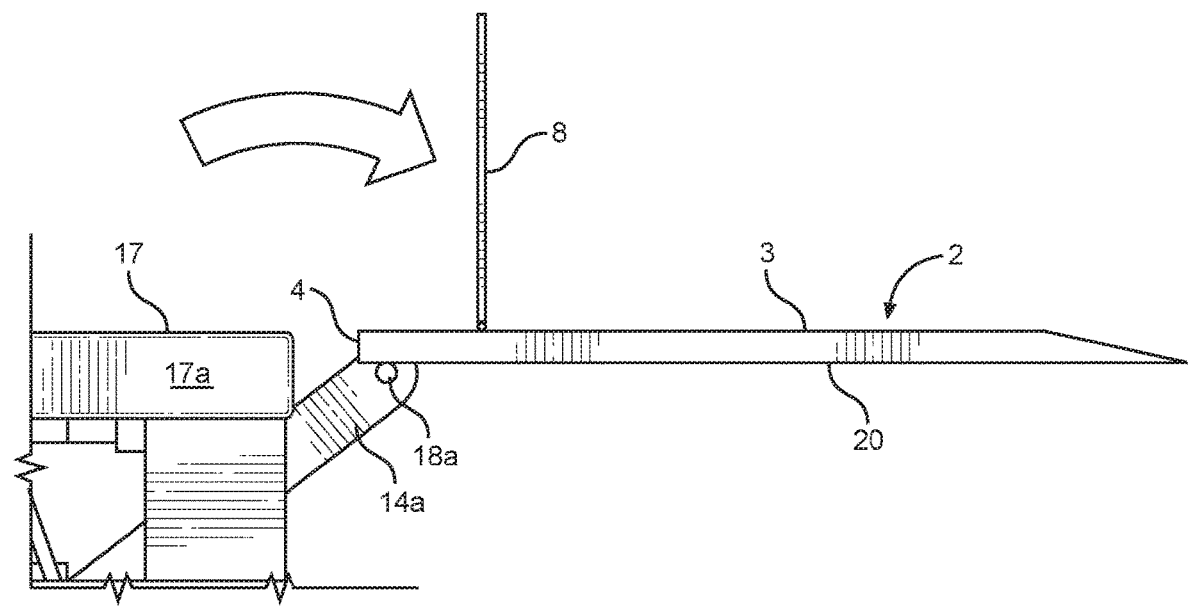
FIG. 4 is a side view illustrating Lift Gate Extension Plate out of the loading position according to an embodiment of the present invention of FIG. 1.

The truck lift gate system 1 further includes an extension plate 8 which includes an upper surface 9, a front edge portion 10 a back edge portion 11 and two spaced parallel side edge portions 12a and 12b as can best be seen in FIG. 2 and FIG. 3. A pair of hinge members 13a and 13b spaced from one another are attached to the back edge portion 11 of the extension plate 8 and to the front edge portion 4 of the lift gate platform 2. The hinge members 13a and 13b are welded to the back edge portion 11 of the extension plate 8. The extension plate 8 is between six to eight feet in length and between fifteen and twenty inches in width and is formed from steel.

The extension plate 8 is adapted to pivot (as shown by the arrows in FIG. 2) with respect to the lift gate platform 2 and substantially cover any gap 21 between the lift gate platform 2 and a loading platform of a back end section 17a of a truck 17 (as shown in FIG. 3) when the lift gate platform 2 is placed in a loading position with respect to the loading platform of a back end section of a truck 17 via the lifting and lowering mechanism 7. This is particularly advantageous when loading or unloading goods because it prevents a foot or a wheel from a dolly 20 from getting stuck in the gap 21.

The extension plate 8 is adapted to pivot with respect to the lift gate platform 2 (as shown by the arrow in FIG. 4) and lay on top of the upper surface 3 of the lift gate platform 2 when the lift gate platform 2 is moved out of the loading position with respect to the loading platform of the back end section of a truck 17 via the lifting and lowering mechanism 7.

Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. An improved lift gate system comprising:
 a lift gate platform including:
  an upper surface;
  a lower surface;
  a front edge portion;
  a back edge portion; and
  two spaced side edge portions;
   wherein said two spaced side edge portions extend between said front edge portion and said back edge portion; and
 a lifting and lowering mechanism;
  wherein said lifting and lowering mechanism is movably attachable to a back end section of a truck and adapted to move said lift gate platform into and out of a loading position with respect to a loading platform of said truck;
 an extension plate including:
  an upper surface;
  a front edge portion;
  a back edge portion; and
  two spaced side edge portions;
   wherein said two spaced side edge portions extending between said front edge portion and said back edge portion; and
 at least one hinge member;
  wherein said at least one hinge member is attached to said back edge portion of said extension plate; and
  wherein said at least one hinge member is adapted to be attached to said front edge portion of said lift gate platform;
 wherein said extension plate is configured to pivot with respect to said lift gate platform from a position that rest upon said loading platform of said back end section of a truck to a position that substantially covers a gap created between said lift gate platform and said loading platform of a back end section of said truck when said lift gate platform is placed in a loading position with respect to said loading platform of said truck via said lifting and lowering mechanism; and
 wherein said extension plate is adapted to pivot with respect to said lift gate platform and lay on top of said upper surface of said lift gate platform when said lift gate platform is moved out of said loading position with respect to said loading platform of said truck via said lifting and lowering mechanism.

2. The improved lift gate system of claim 1, wherein said extension plate is formed having dimensions including between 6 to 8 feet in length and between 15 to 20 inches in width.

3. The improved lift gate system of claim 1, wherein said extension plate is formed from steel.

4. The improved lift gate system of claim 3, wherein said two hinge members are welded to said back edge portion of said extension plate.

5. The improved lift gate system of claim 1, wherein there are two hinge members space from one another and attached to said back edge portion of said extension plate.

6. The improved lift gate system of claim 1, wherein said at least one hinge member is welded to said back edge portion of said extension plate.

7. The improved lift gate system of claim 1, wherein said lifting and lowering mechanism includes:
  two spaced linkage members;
    wherein said two spaced linkage members are pivotally connected to said lower surface of said lift gate platform;
  at least one connector bar;
    wherein said at least one connector bar is rigidly connected between said two spaced linkage members; and
  a hydraulic cylinder;
    wherein said hydraulic cylinder is pivotally connected at a proximal end thereof to one of said at least one connector bar, is adapted to be pivotally connected at a distal end to said back end section of said truck, and is adapted to move said lift gate platform in and out of said loading position with respect to said loading platform of said truck.

8. A combination of a truck and an improved lift gate system, said combination comprising:
  a truck including:
    a back end section including:
      a loading platform; and
  an improved lift gate system comprising:
    a lift gate platform including:
      an upper surface;
      a lower surface;
      a front edge portion;
      a back edge portion; and
      two spaced side edge portions;
        wherein said two spaced side edge portions extend between said front edge portion and said back edge portion; and
    a lifting and lowering mechanism;
      wherein said lifting and lowering mechanism is movably attachable to a back end section of a truck and adapted to move said lift gate platform into and out of a loading position with respect to a loading platform of said truck;
    an extension plate including:
      an upper surface;
      a front edge portion;
      a back edge portion; and
      two spaced side edge portions;
        wherein said two spaced side edge portions extending between said front edge portion and said back edge portion; and
      at least one hinge member;
        wherein said at least one hinge member is attached to said back edge portion of said extension plate; and
        wherein said at least one hinge member is adapted to be attached to said front edge portion of said lift gate platform;
      wherein said extension plate is configured to pivot with respect to said lift gate platform from a position that rest upon said loading platform of said back end section of a truck to a position that substantially covers a gap created between said lift gate platform and said loading platform of a back end section of said truck when said lift gate platform is placed in a loading position with respect to said loading platform of said truck via said lifting and lowering mechanism; and
      wherein said extension plate is adapted to pivot with respect to said lift gate platform and lay on top of said upper surface of said lift gate platform when said lift gate platform is moved out of said loading position with respect to said loading platform of said truck via said lifting and lowering mechanism.

9. The improved lift gate system of claim 8, wherein there are two hinge members space from one another and attached to said back edge portion of said extension plate.

10. The improved lift gate system of claim 9, wherein said two hinge members are welded to said back edge portion of said extension plate.

11. The improved lift gate system of claim 8, wherein said at least one hinge member is welded to said back edge portion of said extension plate.

12. The improved lift gate system of claim 8, wherein said lifting and lowering mechanism includes:
  two spaced linkage members;
    wherein said two spaced linkage members are pivotally connected to said lower surface of said lift gate platform;
  at least one connector bar;
    wherein said at least one connector bar is rigidly connected between said two spaced linkage members; and
  a hydraulic cylinder;
    wherein said hydraulic cylinder is pivotally connected at a proximal end thereof to one of said at least one connector bar, is adapted to be pivotally connected at a distal end to said back end section of said truck, and is adapted to move said lift gate platform in and out of said loading position with respect to said loading platform of said truck.

* * * * *